(12) United States Patent
Shen et al.

(10) Patent No.: US 9,741,135 B2
(45) Date of Patent: Aug. 22, 2017

(54) METHOD FOR MEASURING OBJECT AND SMART DEVICE

(71) Applicant: BAIDU ONLINE NETWORK TECHNOLOGY (BEIJING) CO., LTD., Beijing (CN)

(72) Inventors: Yuebo Shen, Beijing (CN); Jiawei Gu, Beijing (CN)

(73) Assignee: BAIDU ONLINE NETWORKS TECHNOLOGY (BEIJING) CO., LTD., Beijing (CN)

( * ) Notice: Subject to any disclaimer, the term of this patent is extended or adjusted under 35 U.S.C. 154(b) by 107 days.

(21) Appl. No.: 14/818,410

(22) Filed: Aug. 5, 2015

(65) Prior Publication Data
US 2016/0180550 A1    Jun. 23, 2016

(30) Foreign Application Priority Data
Dec. 22, 2014   (CN) .......................... 2014 1 0808800

(51) Int. Cl.
G06K 9/00      (2006.01)
G06T 7/60      (2017.01)
G01B 11/28     (2006.01)
G01B 11/02     (2006.01)

(52) U.S. Cl.
CPC ............. *G06T 7/602* (2013.01); *G01B 11/02* (2013.01); *G01B 11/28* (2013.01); *G01B 11/285* (2013.01); *G06T 2207/10016* (2013.01); *G06T 2207/20092* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 5,161,313 A | 11/1992 | Rijlaarsadam | |
| 5,780,846 A | 7/1998 | Angilella et al. | |
| 6,373,579 B1* | 4/2002 | Ober | G01B 11/002 250/559.38 |
| 7,853,038 B2* | 12/2010 | Lee | G06T 7/60 382/100 |
| 8,761,434 B2* | 6/2014 | Marks | G06T 7/20 382/103 |
| 9,239,950 B2* | 1/2016 | Fletcher | G06K 9/00335 |

(Continued)

FOREIGN PATENT DOCUMENTS

| CN | 101763460 | 6/2010 |
|---|---|---|
| CN | 103308026 | 9/2013 |

(Continued)

OTHER PUBLICATIONS

Koike ("Integrating paper and digital information on Enhanced-Desk: A method for realtime finger tracking on an augmented desk", 2001).*

*Primary Examiner* — Avinash Yentrapati
(74) *Attorney, Agent, or Firm* — Hodgson Russ LLP

(57) ABSTRACT

A method for measuring an object and a smart device are provided. The method includes: detecting by a smart device a track of a target object moving along the object to be measured; calculating a parameter of the track by the smart device according to the track; and acquiring a parameter of the object to be measured by the smart device according to the parameter of the track.

20 Claims, 4 Drawing Sheets

(56) References Cited

U.S. PATENT DOCUMENTS

| | | | | |
|---|---|---|---|---|
| 2003/0174890 | A1* | 9/2003 | Yamauchi | A61B 5/1075 382/199 |
| 2005/0111710 | A1* | 5/2005 | Gritzky | A61B 8/467 382/128 |
| 2008/0166019 | A1* | 7/2008 | Lee | G06T 7/60 382/106 |
| 2008/0316324 | A1* | 12/2008 | Rofougaran | G01S 13/426 348/222.1 |
| 2010/0303297 | A1* | 12/2010 | Mikhailov | G06T 7/11 382/103 |
| 2011/0221974 | A1* | 9/2011 | Stern | G06F 3/017 348/734 |
| 2011/0235855 | A1* | 9/2011 | Smith | G06F 3/0304 382/103 |
| 2014/0100813 | A1* | 4/2014 | Showering | G01B 21/02 702/141 |
| 2014/0104413 | A1* | 4/2014 | McCloskey | G06Q 10/083 348/135 |
| 2014/0104414 | A1* | 4/2014 | McCloskey | G06Q 10/083 348/135 |
| 2014/0184496 | A1* | 7/2014 | Gribetz | G02B 27/017 345/156 |
| 2014/0198945 | A1* | 7/2014 | Hsiao | G06T 7/246 382/103 |
| 2014/0300722 | A1 | 10/2014 | Garcia | |
| 2014/0314276 | A1* | 10/2014 | Wexler | G06T 7/602 382/103 |
| 2015/0003673 | A1* | 1/2015 | Fletcher | G06K 9/00375 382/103 |
| 2015/0363665 | A1* | 12/2015 | Szasz | G06K 9/52 382/203 |

FOREIGN PATENT DOCUMENTS

| | | |
|---|---|---|
| CN | 103604371 | 2/2014 |
| DE | 3602165 | 7/1987 |
| JP | 2009048440 | 3/2009 |

\* cited by examiner

METHOD FOR MEASURING OBJECT AND SMART DEVICE

CROSS-REFERENCE TO RELATED APPLICATION

This application claims priority to and benefits of Chinese Patent Application Serial No. 201410808800.6, filed with the State Intellectual Property Office of P. R. China on Dec. 22, 2014, the entire content of which is incorporated herein by reference.

FIELD

The present disclosure relates to a smart device technology, and more particularly to a method for measuring an object and a smart device.

BACKGROUND

During the daily life, particularly in various design fields, such as modern product industrial design, urban planning and design, fashion design, there are great demands for measuring sizes of various products. Physical rulers are used as the measurement tools in the conventional mode. Such conventional mode, however, is generally restricted by the physical shape of an object, such that it is difficult to measure an object with irregular shape. Moreover, the conventional mode is not convenient to operate.

With the developments of modern digital application products, digital measurement is also applied for measuring an object. Presently, novel electronic products using infrared ray measurement or ultrasonic measurement are used for measuring an object. However, a length, size or area of an object with irregular shape cannot be obtained efficiently and quickly by these methods. Therefore, a method for measuring an object efficiently, conveniently and accurately is needed.

SUMMARY

Embodiments of the present disclosure seek to solve at least one of the problems existing in the related art to at least some extent.

According to a first aspect of the present disclosure, a method for measuring an object is provided. The method includes: detecting by a smart device a track of a target object moving along the object to be measured; calculating a parameter of the track by the smart device according to the track; and acquiring a parameter of the object to be measured by the smart device according to the parameter of the track.

According to a second aspect of the present disclosure, a smart device is provided. The smart device includes one or more processors, a memory and one or more program modules stored in the memory and to be executed by the more or more processors, the one or more program modules including instructions for: detecting a track of a target object moving along an object to be measured; calculating a parameter of the track according to the track; and acquiring a parameter of the object to be measured according to the parameter of the track.

According to a third aspect of the present disclosure, a non-transitory computer readable medium used in conjunction with a smart device for measuring an object, the smart device having one or more processors and a memory, the computer readable medium including instructions for: detecting a track of a target object moving along the object to be measured; calculating a parameter of the track according to the track; and acquiring a parameter of the object to be measured according to the parameter of the track.

In summary, by using a novel human-computer interaction mode, a length, size or area of an object with regular or irregular physical shape may be measured. Moreover, this method is quite efficient and conveniently, and a measurement result is more accurate.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
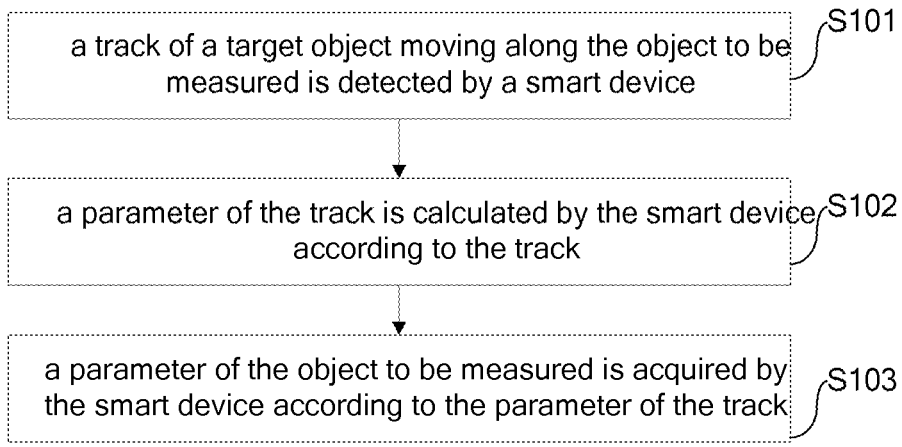
FIG. 1 is a flow chart of a method for measuring an object according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

According to a first aspect of the present disclosure, a method for measuring an object is provided. The method includes steps of: detecting by a smart device a track of a target object moving along the object to be measured; calculating a parameter of the track by the smart device according to the track; and acquiring a parameter of the object to be measured by the smart device according to the parameter of the track.

FIG. 1 is a flow chart of the method for measuring an object according to an embodiment of the present disclosure. As shown in FIG. 1, the method includes following steps.

At step S101, a track of a target object moving along the object to be measured is detected by a smart device.

The smart device may include but is not limited to a smart mobile terminal (such as smart phone, panel computer, notebook computer, personal digital assistant, e-book) and a smart wearable device (such as smart glasses, smart watch).

In one embodiment, the smart device may have a camera configured to shoot the track of the target object moving along the object to be measured. It should be noted that the track of the target object moving along the object to be measured may be detected by other ways in other embodiments, which shall not be illustrated in details herein.

The object to be measured may be an object with regular shape (such as cube, cuboid, sphere) or irregular shape. The detected track of the target object moving along the object to be measured may be a straight line or a curve with either regular shape or irregular shape.

At step S102, a parameter of the track is calculated by the smart device according to the track.

In one embodiment, the parameter may be a length or an area, such that a length or an area of the object to be measured may be calculated respectively according to a length or an area of the track.

Specifically, the track of the target object moving along the object to be measured is detected by the smart device so as to obtain a track image, and then the track image may be analyzed so as to calculate the parameter of the track. Particularly, the track image may be analyzed by image processing technology so as to calculate the parameter of the track.

At step S103, a parameter of the object to be measured is acquired by the smart device according to the parameter of the track.

In one embodiment, a ratio of the parameter of the track to a map parameter of the target object on the track may be calculated by the smart device according to the parameter of the track and the map parameter of the target object on the track, and then the parameter of the object to be measured is calculated according to the ratio and a parameter of the target object input by a user or stored in the smart device.

With the method for measuring an object, by using a novel human-computer interaction mode, a length, size or area of an object with regular or irregular physical shape may be measured. Moreover, this method is quite efficient and conveniently, and a measurement result is more accurate.

In one embodiment, after the parameter of the object to be measured is acquired by the smart device according to the parameter of the track, the method may further include a step of broadcasting the parameter of the object to be measured by voice in the smart device, or displaying the parameter of the object to be measured in the smart device. In this way, it is convenient for the user to obtain the measurement result and a user experience is improved.

Figure 2:
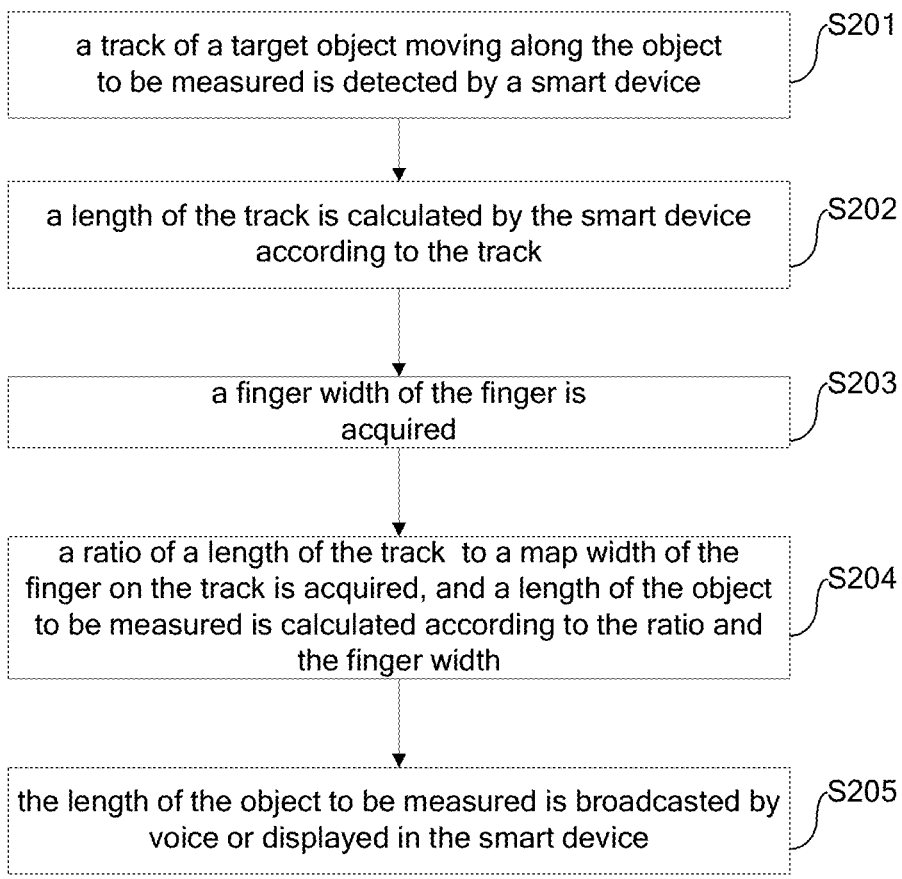
FIG. 2 is a flow chart of a method for measuring an object according to a specific embodiment of the present disclosure.

FIG. 2 is a flow chart of a method for measuring an object according to a specific embodiment of the present disclosure. In this embodiment, the target object is a finger, and the parameter is a length. As shown in FIG. 2, the method includes following steps.

At step S201, a track of a target object moving along the object to be measured is detected by a smart device.

The smart device may include but is not limited to a smart mobile terminal (such as smart phone, panel computer, notebook computer, personal digital assistant, e-book) and a smart wearable device (such as smart glasses, smart watch).

In one embodiment, the smart device may have a camera configured to shoot the track of the target object moving along the object to be measured. It should be noted that the track of the target object moving along the object to be measured may be detected by other ways in other embodiments, which shall not be illustrated in details herein.

Figure 3A:
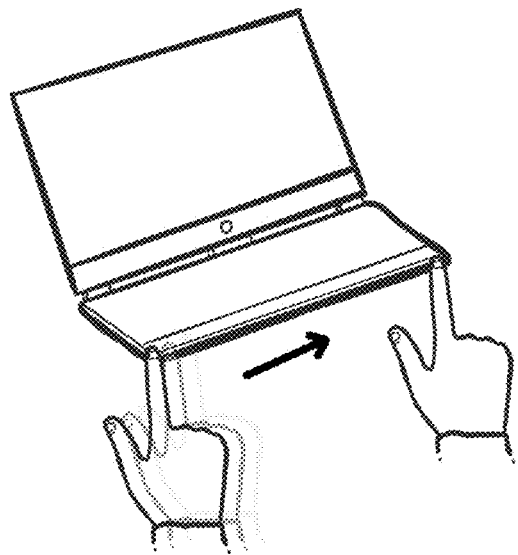
FIG. 3a is a schematic view showing a finger moving along a side of a notebook computer according to an embodiment of the present disclosure.
Figure 3B:
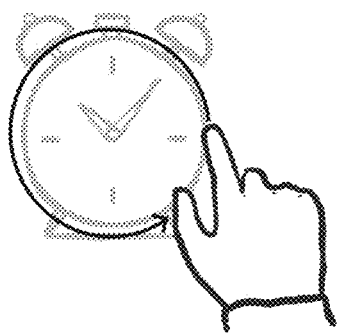
FIG. 3b is a schematic view showing a finger moving along a dial of an alarm clock according to an embodiment of the present disclosure.

For example, FIG. 3a is a schematic view showing a finger moving along a side of a notebook computer according to an embodiment of the present disclosure, and FIG. 3b is a schematic view showing a finger moving along a dial of an alarm clock according to an embodiment of the present disclosure. The tracks of the finger moving along the objects to be measured during above two processes may be shot by the camera of the smart device. It can be seen from FIG. 3a and FIG. 3b that, not only a straight line track but also a circular track may be detected by the smart device. Certainly, in other embodiments, tracks of the finger or other target object moving along the object to be measured with regular shape or irregular shape also may be detected by the smart device.

The object to be measured may be an object with regular shape (such as cube, cuboid, sphere) or irregular shape. The detected track of the target object moving along the object to be measured may be a straight line or a curve with either regular shape or irregular shape.

At step S202, a length of the track is calculated by the smart device according to the track.

Specifically, the track of the target object moving along the object to be measured is detected by the smart device so as to obtain a track image, and then the track image may be analyzed so as to calculate the length of the track. Particularly, the track image may be analyzed by image processing technology so as to calculate the length of the track.

At step S203, a finger width of the finger is acquired.

In one embodiment, the finger width of the finger may be input manually by the user of the smart device via an input interface (such as a touch keyboard, an audio input interface). Certainly, one of finger widths stored in the smart device may be selected as the finger width of the finger according to the user's instruction.

At step S204, a ratio of a length of the track to a map width of the finger on the track is acquired, and a length of the object to be measured is calculated according to the ratio and the width of the finger.

In one embodiment, the map width of the finger on the track may be acquired by analyzing the track image obtained at step S202. The ratio a/b of the length a of the track to the map width b of the finger on the track is acquired, and the length A of the object to be measured is calculated according to the ratio a/b and the finger width B of the finger, i.e., $A=B/(a/b)$.

Alternatively, at step S205, the length of the object to be measured is broadcasted by voice or displayed in the smart device.

With the method for measuring an object, using the smart device, by detecting the track of the finger moving along the object to be measured and acquiring the length of the track, the length of the object to be measured may be measured according to the length of the track. Moreover, this method is quite efficient and conveniently, a measurement result is more accurate, and a user experience is improved.

Figure 4:
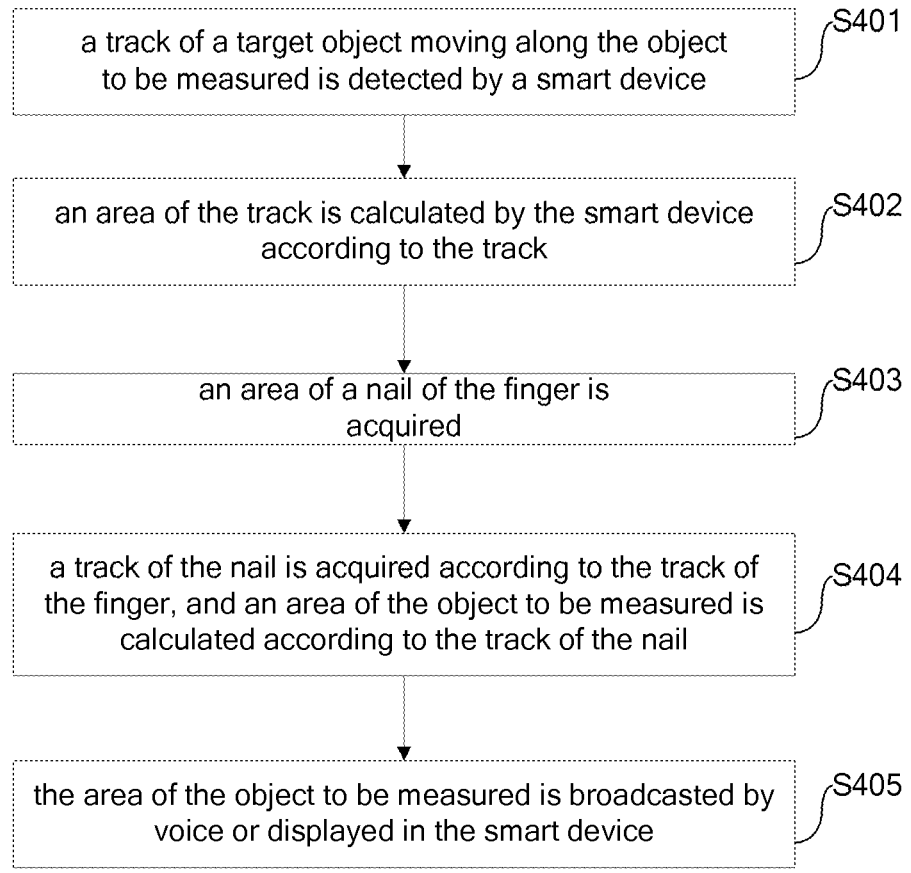
FIG. 4 is a flow chart of a method for measuring an object according to a specific embodiment of the present disclosure.

FIG. 4 is a flow chart of a method for measuring an object according to a specific embodiment of the present disclosure. In this embodiment, the target object is a finger, and the parameter is an area. As shown in FIG. 4, the method includes following steps.

At step S401, a track of a target object moving along the object to be measured is detected by a smart device.

The smart device may include but is not limited to a smart mobile terminal (such as smart phone, panel computer, notebook computer, personal digital assistant, e-book) and a smart wearable device (such as smart glasses, smart watch).

In one embodiment, the smart device may have a camera configured to shoot the track of the target object moving along the object to be measured. It should be noted that the track of the target object moving along the object to be measured may be detected by other ways in other embodiments, which shall not be illustrated in details herein.

The object to be measured may be an object with regular shape (such as cube, cuboid, sphere) or irregular shape. The detected track of the target object moving along the object to be measured may be a straight line or a curve with either regular shape or irregular shape.

At step S402, an area of the track is calculated by the smart device according to the track.

Specifically, the track of the target object moving along the object to be measured is detected by the smart device so as to obtain a track image, and then the track image may be analyzed so as to calculate the area of the track. Particularly, the track image may be analyzed by image processing technology so as to calculate the area of the track.

At step S403, an area of a nail of the finger is acquired.

In one embodiment, the area of the nail of the finger may be input manually by the user of the smart device via an input interface (such as a touch keyboard, an audio input interface). Certainly, one of areas of the nail of the finger stored in the smart device may be selected as the area of the nail of the finger according to the user's instruction.

At step S404, a track of the nail is acquired according to the track of the finger, and an area of the object to be measured is calculated according to the track of the nail.

In one embodiment, a map area of the nail on the track of the finger may be acquired by analyzing the track image obtained at step S402. A ratio s1/s2 of an area s1 of the track of the nail to the map area s2 of the nail on the track of the finger is acquired, and the area S1 of the object to be measured is calculated according to the ratio s1/s2 and the area S2 of the nail, i.e., S1=S2/(s1/s2).

Alternatively, at step S405, the area of the object to be measured is broadcasted by voice or displayed in the smart device.

With the method for measuring an object, using the smart device, by detecting the track of the finger moving along the object to be measured and acquiring the area of the track, the area of the object to be measured may be measured according to the area of the track. Moreover, this method is quite efficient and conveniently, a measurement result is more accurate, and a user experience is improved.

Figure 5:
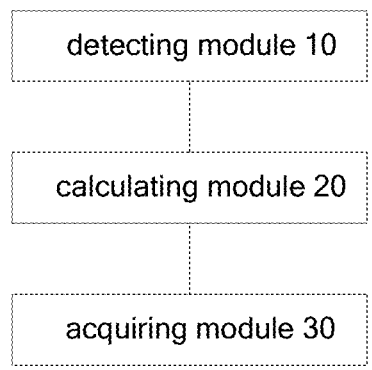
FIG. 5 is a block diagram of an apparatus for measuring an object according to an embodiment of the present disclosure.

FIG. 5 is a block diagram of an apparatus for measuring an object according to an embodiment of the present disclosure. As shown in FIG. 5, the apparatus includes: a detecting module 10, a calculating module 20 and an acquiring module 30.

The detecting module 10 is configured to detect a track of a target object moving along the object to be measured.

The calculating module 20 is configured to calculate a parameter of the track according to the track.

The acquiring module 30 is configured to acquire a parameter of the object to be measured according to the parameter of the track.

Figure 6:
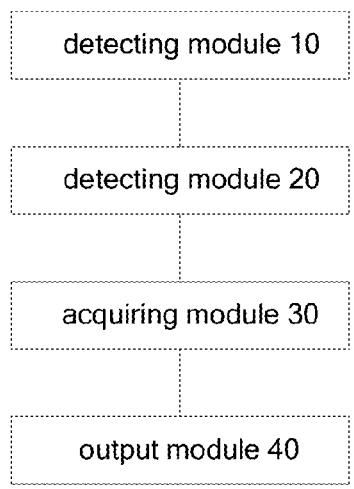
FIG. 6 is a block diagram of an apparatus for measuring an object according to another embodiment of the present disclosure.

FIG. 6 is a block diagram of an apparatus for measuring an object according to another embodiment of the present disclosure. As shown in FIG. 6, the smart device includes: a detecting module 10, a calculating module 20, an acquiring module 30 and an output module 40.

Specifically, the detecting module 10, the calculating module 20 and the acquiring module 30 may refer to the embodiment described above with reference to FIG. 5, which will not described in details herein.

The output module 40 is configured to broadcast the parameter of the object to be measured by voice or to display the parameter of the object to be measured, after the parameter of the object to be measured is acquired by the smart device according to the parameter of the track.

It should be noted that, the above-described apparatuses correspond to the methods described above respectively. For example, the aforementioned methods for measuring an object are applicable to the apparatuses and can achieve the same technical result.

Further, embodiments of the present disclosure include a smart device including an apparatus as described above, e.g., a smart phone, a tablet PC and other mobile electronic devices.

Figure 7:
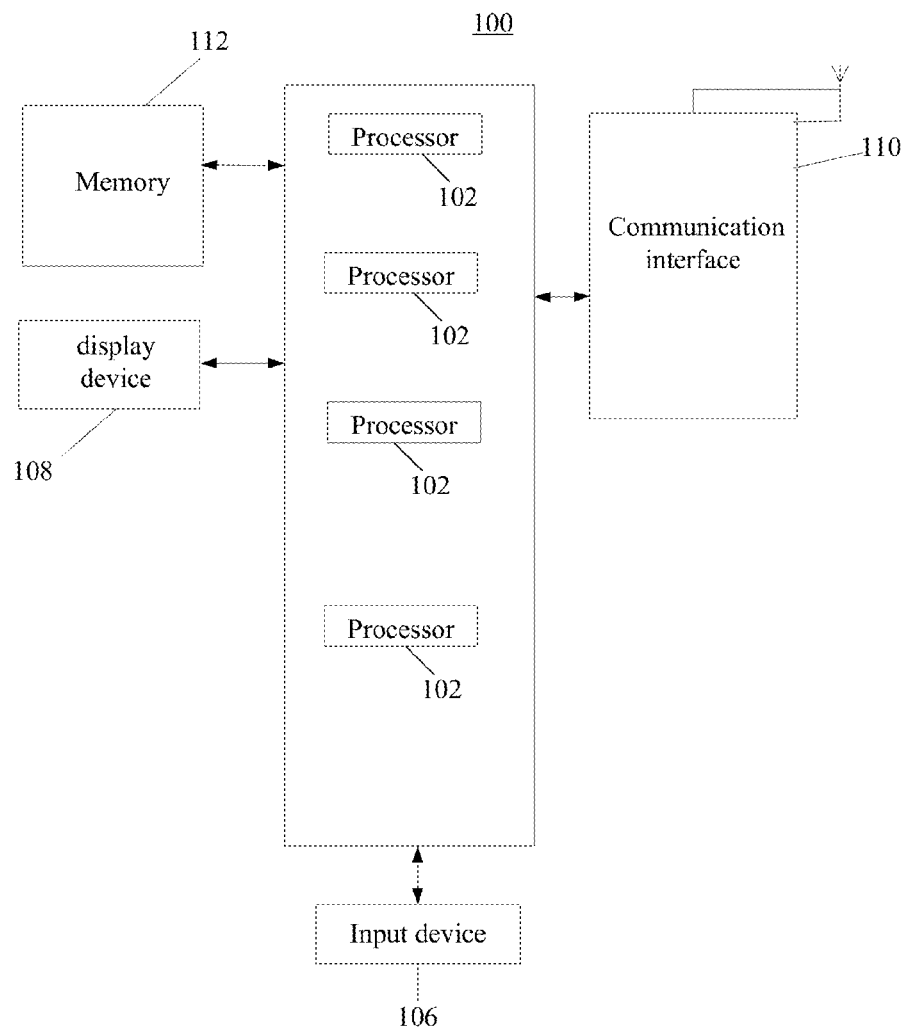
FIG. 7 is a block diagram of a smart device according to an embodiment of the present disclosure.

FIG. 7 is a block diagram of a smart device 100 according to an embodiment of the present disclosure. The smart device 100 includes one or more processors 102 for executing modules, programs and/or instructions stored in a memory 112 and thereby performing predefined operations; one or more network or other communication interfaces 110; memory 112; and one or more communication buses 114 for interconnecting these components. In some embodiments, the smart device includes user interface, such as a display device 108 and one or more input devices 106 (e.g., keyboard or mouse).

In some embodiments, the memory 112 includes high-speed random access memory, such as DRAM, SRAM, DDR RAM or other random access solid state memory devices. In some embodiments, memory 112 includes non-volatile memory, such as one or more magnetic disk storage devices, optical disk storage devices, flash memory devices, or other non-volatile solid state storage devices. In some embodiments, memory 412 includes one or more storage devices remotely located from the processor(s) 102. Memory 112, or alternately one or more storage devices (e.g., one or more nonvolatile storage devices) within memory 112, includes a non-transitory computer readable storage medium. In some embodiments, memory 112 or the computer readable storage medium of memory 112 stores the following instructions for:

detecting a track of a target object moving along an object to be measured;

calculating a parameter of the track according to the track; and acquiring a parameter of the object to be measured according to the parameter of the track.

In some implementations, the target object is a finger, the parameter is a length, and the instruction for acquiring a parameter of the object to be measure according to the parameter of the track includes instructions for:

acquiring a finger width of the finger;

acquiring a ratio of a length of the track to a map width of the finger on the track; and calculating a length of the object to be measured according to the ratio and the finger width.

In other implementations, the target object is a finger, the parameter is an area, and the instruction for acquiring a parameter of the object to be measured according to the parameter of the track includes instructions for:
    acquiring an area of a nail of the finger;
    acquiring a track of the nail according to the track of the finger; and
    calculating an area of the object to be measured according to the track of the nail.

Specifically, the instruction for calculating an area of the object to be measured according to the track of the nail comprises instructions for:
    acquiring a map area of the nail on the track of the finger;
    acquiring a ratio of an area of the track of the nail to the map area of the nail on the track of the finger; and
    calculating an area of the object to be measured according to the ratio and the area of the nail.

In alternative embodiments, the memory 112 or the computer readable storage medium of memory 112 further stores the following instructions for: broadcasting the parameter of the object to be measured by voice or displaying the parameter of the object to be measured.

In some embodiments, the smart device 100 may have a camera for shooting the track of the target object moving along the object to be measured.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A method for measuring an object, comprising:
    detecting by a smart device a track of a target object moving along the object to be measured;
    calculating a parameter of the track by the smart device according to the track; and
    acquiring a parameter of the object to be measured by the smart device according to the parameter of the track;
    wherein the target object is a finger, and acquiring a parameter of the object to be measured by the smart device according to the parameter of the track comprises one or more of the following: a finger width of the finger and an area of a nail of the finger.

2. The method according to claim 1, wherein the parameter is a length, and acquiring a parameter of the object to be measured by the smart device according to the parameter of the track comprises:
acquiring the finger width of the finger;
acquiring a ratio of a length of the track to a map width of the finger on the track; and
calculating a length of the object to be measured according to the ratio and the finger width.

3. The method according to claim 1, wherein the parameter is an area, and acquiring a parameter of the object to be measured by the smart device according to the parameter of the track comprises:
acquiring an area of the nail of the finger;
acquiring a track of the nail according to the track of the finger; and
calculating an area of the object to be measured according to the track of the nail.

4. The method according to claim 3, wherein calculating an area of the object to be measured according to the track of the nail comprises:
acquiring a map area of the nail on the track of the finger;
acquiring a ratio of an area of the track of the nail to the map area of the nail on the track of the finger; and
calculating an area of the object to be measured according to the ratio and the area of the nail.

5. The method according to claim 1, wherein after acquiring the parameter of the object to be measured by the smart device according to the parameter of the track, further comprising:
broadcasting the parameter of the object to be measured by the smart device via voice.

6. The method according to claim 1, wherein after acquiring a parameter of the object to be measured by the smart device according to the parameter of the track, further comprising:
displaying the parameter of the object to be measured in the smart device.

7. The method according to claim 1, wherein detecting by a smart device a track of a target object moving along the object to be measured comprises:
shooting by a camera of the smart device the track of the target object moving along the object to be measured.

8. A smart device, comprising:
one or more processors;
a memory; and
one or more program modules stored in the memory and to be executed by the more or more processors, the one or more program modules comprising instructions for:
detecting a track of a target object moving along an object to be measured;
calculating a parameter of the track according to the track; and
acquiring a parameter of the object to be measured according to the parameter of the track;
wherein the target object is a finger, and acquiring a parameter of the object to be measured by the smart device according to the parameter of the track comprises one or more of the following: a finger width of the finger and an area of a nail of the finger.

9. The smart device according to claim 8, wherein the parameter is a length, and the instruction for acquiring a parameter of the object to be measure according to the parameter of the track comprises instructions for:
acquiring the finger width of the finger;
acquiring a ratio of a length of the track to a map width of the finger on the track; and
calculating a length of the object to be measured according to the ratio and the finger width.

10. The smart device according to claim 8, wherein the the parameter is an area, and the instruction for acquiring a parameter of the object to be measured according to the parameter of the track comprises instructions for:
acquiring an area of the nail of the finger;
acquiring a track of the nail according to the track of the finger; and
calculating an area of the object to be measured according to the track of the nail.

11. The smart device according to claim 10, wherein the instruction for calculating an area of the object to be measured according to the track of the nail comprises instructions for:
acquiring a map area of the nail on the track of the finger;
acquiring a ratio of an area of the track of the nail to the map area of the nail on the track of the finger; and
calculating an area of the object to be measured according to the ratio and the area of the nail.

12. The smart device according to claim 8, wherein the one or more program modules further comprises instructions for:
broadcasting the parameter of the object to be measured by voice after acquiring the parameter of the object to be measured.

13. The smart device according to claim 8, wherein the one or more program modules further comprises instructions for:
displaying the parameter of the object to be measured after acquiring the parameter of the object to be measured.

14. The smart device according to claim 8, further comprising a camera for shooting the track of the target object moving along the object to be measured.

15. A non-transitory computer readable medium used in conjunction with a smart device for measuring an object, the smart device having one or more processors and a memory, the computer readable medium comprising instructions for:
detecting a track of a target object moving along the object to be measured;
calculating a parameter of the track according to the track; and
acquiring a parameter of the object to be measured according to the parameter of the track;
wherein the target object is a finger, and acquiring a parameter of the object to be measured by the smart device according to the parameter of the track comprises one or more of the following: a finger width of the finger and an area of a nail of the finger.

16. The computer readable medium according to claim 15, wherein the parameter is a length, and the instruction for acquiring a parameter of the object to be measure according to the parameter of the track comprises instructions for:
acquiring the finger width of the finger;
acquiring a ratio of a length of the track to a map width of the finger on the track; and
calculating a length of the object to be measured according to the ratio and the finger width.

17. The computer readable medium according to claim 15, wherein the parameter is an area, and the instruction for acquiring a parameter of the object to be measured according to the parameter of the track comprises instructions for:
acquiring an area of the nail of the finger;
acquiring a track of the nail according to the track of the finger; and calculating an area of the object to be measured according to the track of the nail.

18. The computer readable medium according to claim 17, wherein the instruction for calculating an area of the object to be measured according to the track of the nail comprises instructions for:
acquiring a map area of the nail on the track of the finger;
acquiring a ratio of an area of the track of the nail to the map area of the nail on the track of the finger; and
calculating an area of the object to be measured according to the ratio and the area of the nail.

19. The computer readable medium according to claim 15, further comprising instructions for:
broadcasting the parameter of the object to be measured by voice after acquiring the parameter of the object to be measured.

20. The computer readable medium according to claim 15, further comprising instructions for:
displaying the parameter of the object to be measured after acquiring the parameter of the object to be measured.

* * * * *